United States Patent
Cargnoni et al.

(10) Patent No.: US 7,055,003 B2
(45) Date of Patent: May 30, 2006

(54) DATA CACHE SCRUB MECHANISM FOR LARGE L2/L3 DATA CACHE STRUCTURES

(75) Inventors: Robert Alan Cargnoni, Austin, TX (US); Guy Lynn Guthrie, Austin, TX (US); Harmony Lynn Helterhoff, Austin, TX (US); Kevin Franklin Reick, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 10/424,528

(22) Filed: Apr. 25, 2003

(65) Prior Publication Data

US 2004/0215886 A1 Oct. 28, 2004

(51) Int. Cl.
G06F 13/00 (2006.01)

(52) U.S. Cl. .............. 711/135; 711/122; 711/124; 711/134

(58) Field of Classification Search ........ 711/122, 711/124, 134, 135
See application file for complete search history.

(56) References Cited

U.S. PATENT DOCUMENTS

| | | | | |
|---|---|---|---|---|
| 5,895,488 A | * | 4/1999 | Loechel | 711/135 |
| 5,974,507 A | * | 10/1999 | Arimilli et al. | 711/133 |
| 6,480,975 B1 | * | 11/2002 | Arimilli et al. | 714/52 |
| 6,493,801 B1 | * | 12/2002 | Steely et al. | 711/135 |
| 2002/0112129 A1 | * | 8/2002 | Arimilli et al. | 711/141 |

\* cited by examiner

Primary Examiner—Reba I. Elmore
(74) Attorney, Agent, or Firm—Casimer K. Salys; Jack V. Musgrove

(57) ABSTRACT

A method of reducing errors in a cache memory of a computer system (e.g., an L2 cache) by periodically issuing a series of purge commands to the L2 cache, sequentially flushing cache lines from the L2 cache to an L3 cache in response to the purge commands, and correcting errors (single-bit) in the cache lines as they are flushed to the L3 cache. Purge commands are issued only when the processor cores associated with the L2 cache have an idle cycle available in a store pipe to the cache. The flush rate of the purge commands can be programmably set, and the purge mechanism can be implemented either in software running on the computer system, or in hardware integrated with the L2 cache. In the case of the software, the purge mechanism can be incorporated into the operating system. In the case of hardware, a purge engine can be provided which advantageously utilizes the store pipe that is provided between the L1 and L2 caches. The L2 cache can be forced to victimize cache lines, by setting tag bits for the cache lines to a value that misses in the L2 cache (e.g., cache-inhibited space). With the eviction mechanism of the cache placed in a direct-mapped mode, the address misses will result in eviction of the cache lines, thereby flushing them to the L3 cache.

24 Claims, 4 Drawing Sheets

DATA CACHE SCRUB MECHANISM FOR LARGE L2/L3 DATA CACHE STRUCTURES

CROSS-REFERENCE TO RELATED APPLICATION

The present application is related to copending U.S. patent application Ser. No. 10/424,486 entitled "INTEGRATED PURGE STORE MECHANISM TO FLUSH L2/L3 CACHE STRUCTURE FOR IMPROVED RELIABILITY AND SERVICEABILITY" filed on Apr. 25, 2003.

BACKGROUND OF THE INVENTION

1. Field of the Invention

The present invention generally relates to computer systems, and more particularly to a method of scrubbing or purging a memory system such as a cache memory, to facilitate serviceability and decrease the likelihood of multiple uncorrectable errors which would otherwise cause a system halt.

2. Description of the Related Art

The basic structure of a conventional computer system 10 is shown in FIG. 1. Computer system 10 may have one or more processing units, two of which 12a and 12b are depicted, which are connected to various peripheral devices, including input/output (I/O) devices 14 (such as a display monitor, keyboard, and permanent storage device), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20. Computer system 10 may have many additional components which are not shown, such as serial, parallel and universal bus ports for connection to, e.g., modems or printers. Those skilled in the art will further appreciate that there are other components that might be used in conjunction with those shown in the block diagram of FIG. 1; for example, a display adapter might be used to control a video display monitor, a memory controller can be used to access memory 16, etc. Also, instead of connecting I/O devices 14 directly to bus 20, they may be connected to a secondary (I/O) bus which is further connected to an I/O bridge to bus 20. The computer can have more than two processing units.

In a symmetric multi-processor (SMP) computer, all of the processing units are generally identical, that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corp. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data between the processor core and the cache memory.

A processing unit 12 can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 256 or 512 kilobytes, while the processor may be an IBM PowerPC 604-series processor having on-board caches with 64 kilobytes of total storage. Cache 30 is connected to bus 20, and all loading of information from memory 16 into processor core 22 usually comes through cache 30. Although FIG. 1 depicts only a two-level cache hierarchy, multi-level cache hierarchies can be provided where there are many levels of interconnected caches.

A cache has many "blocks" which individually store the various instructions and data values. The blocks in any cache are divided into groups of blocks called "sets" or "congruence classes." A set is the collection of cache blocks that a given memory block can reside in. For any given memory block, there is a unique set in the cache that the block can be mapped into, according to preset mapping functions. The number of blocks in a set is referred to as the associativity of the cache, e.g. 2-way set associative means that for any given memory block there are two blocks in the cache that the memory block can be mapped into; however, several different blocks in main memory can be mapped to any given set. A 1-way set associate cache is direct mapped, that is, there is only one cache block that can contain a particular memory block. A cache is said to be fully associative if a memory block can occupy any cache block, i.e., there is one congruence class, and the address tag is the full address of the memory block.

An exemplary cache line (block) includes an address tag field, a state bit field, an inclusivity bit field, and a value field for storing the actual instruction or data. The state bit field and inclusivity bit fields are used to maintain cache coherency in a multiprocessor computer system (to indicate the validity of the value stored in the cache). The address tag is a subset of the full address of the corresponding memory block. A compare match of an incoming address with one of the tags within the address tag field indicates a cache "hit." The collection of all of the address tags in a cache (and sometimes the state bit and inclusivity bit fields) is referred to as a directory, and the collection of all of the value fields is the cache entry array.

When all of the blocks in a congruence class for a given cache are full and that cache receives a request, whether a "read" or "write," to a memory location that maps into the full congruence class, the cache must "evict" one of the blocks currently in the class. The cache chooses a block by one of a number of means known to those skilled in the art (least recently used (LRU), random, pseudo-LRU, etc.) to be evicted. If the data in the chosen block is modified, that data is written to the next lowest level in the memory hierarchy which may be another cache (in the case of the L1 or on-board cache) or main memory (in the case of an L2 cache, as depicted in the two-level architecture of FIG. 1). By the principle of inclusion, the lower level of the hierarchy will already have a block available to hold the written modified data. However, if the data in the chosen block is not modified, the block is simply abandoned and not written to the next lowest level in the hierarchy. This process of removing a block from one level of the hierarchy is known as an "eviction." At the end of this process, the cache no longer holds a copy of the evicted block. When a device such as the CPU or system bus needs to know if a particular cache line is located in a given cache, it can perform a "snoop" request to see if the address is in the directory for that cache.

Various techniques have been devised to optimize cache usage, such as special cache instructions which are used to clear out lines in a cache. For example, the PowerPC instruction set provides several commands that allow a device to gain ownership of a memory block. These commands often result when a device issues a read-with-intent-to-modify (RWITM) instruction. The PowerPC flush instructions (e.g., data cache block flush—"DCBF") cause a cache block to be made available by invalidating the cache block if it contains an unmodified ("shared" or "exclusive") copy of a memory block or, if the cache block contains a modified copy of a memory block, then by first writing the modified value downward in the memory hierarchy (a "push"), and thereafter invalidating the block. The kill instructions (data cache block invalidate— "DCBI," instruction cache block invalidate—"ICBI," or data cache block set to zero—"DCBZ") are similar to the flush instructions except that a kill instruction immediately forces a cache block to an invalidate state, so any modified block is killed without pushing it out of the cache. For these instructions, the prior art requires that a higher (e.g., L2) cache acknowledge to a lower (e.g., L3) cache when the operation was completed by the higher cache.

Flush commands are particularly useful when all of the cached data in a processing unit must be written to main memory. This type of cache dump might arise in a "hot-plug" situation wherein part of the processing unit's subsystem is being replaced while the remaining computer system is still running (to avoid customer down time), or in an emergency shut-down situation where a catastrophic error has been detected and the state of the machine must be saved quickly before power is cut off. Flush instructions can be used to walk through the entire cache memory as part of a shut-down, but this procedure can sometimes take an inordinate amount of time.

One problem with these cache constructions relates to so-called "soft" errors that might arise from, e.g., stray radiation or electrostatic discharge. Errors of this type can usually be corrected with an error correction code (ECC) circuit which reconstructs the proper data stream. Most ECCs in use correct only single-bit errors, i.e., if two or more bits in a particular block are invalid, then the ECC might not be able to determine what the proper data stream should actually be, but at least the failure can be detected. These ECCs are referred to as single-bit correct/double-bit detect, or SBC/DBD. When uncorrectable double-bit errors are detected, the machine must be halted.

With recent advancements in technology, memory subsystems are becoming larger and consequently require increased reliability and serviceability. In particular, problems with soft errors in large caches can lead to uncorrectable errors when a second soft error arises in the same block as a preexisting soft error. It would, therefore, be desirable to devise a method of decreasing the likelihood that such single-bit errors degrade into uncorrectable double-bit errors. It would be further advantageous if the method could "scrub" these errors without having any significant impact on the performance of the system.

SUMMARY OF THE INVENTION

It is therefore one object of the present invention to provide an improved cache memory for a computer system.

It is another object of the present invention to provide such a cache memory that can scrub soft errors to reduce the likelihood of a system halt due to an uncorrectable error.

It is yet another object of the present invention to provide a mechanism which can periodically purge a cache to facilitate cache dumps that may be required because of, e.g., hot-plugging or emergency shut downs.

The foregoing objects are achieved in a method of reducing errors in a cache memory of a computer system, generally comprising the steps of periodically issuing a series of purge commands to the cache memory, sequentially flushing cache lines from the cache memory to a lower level memory device of the computer system (e.g., a lower level cache) in response to the purge commands, and correcting errors in the cache lines as they are flushed to the lower level memory device. The purge commands are preferably issued only after it has been determined that the processor cores associated with the cache memory are idle. In the illustrative embodiment the error correction code (ECC) can correct only single-bit errors in the cache lines. The flush rate of the purge commands can be programmably set.

The purge mechanism can be implemented either in software running on the computer system, or in hardware integrated with the cache memory. In the case of the software, the purge mechanism can for example be incorporated into the operating system, which monitors CPU usage to determine when the processing cores are idle. In the case of hardware, a purge engine can be added to the cache which is programmably triggered to issue the purge commands. The purge engine can advantageously utilize the store pipe that is provided between two caches for store instructions. Flushing can be achieved by forcing the cache to miss addresses associated with the cache lines (such as by setting tag bits for the cache lines to a value that points to a cache-inhibited space). With the eviction mechanism of the cache placed in a direct-mapped mode, the address misses will result in eviction of the cache lines.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

The present invention is directed to an improved cache construction which is able to "scrub" the values stored in the cache memory, to purge any correctable errors in those stored values so as to reduce the likelihood of an uncorrectable error arising. For caches which utilize error correction code (ECC) having single-bit correct/double-bit detect capability (SBC/DBD), an uncorrectable error might arise if a first soft error is already present but uncorrected in a particular cache line, and then a second soft error is introduced to the same line. If a double-bit error in the line is detected, the machine must be brought to a halt. The present invention accordingly decreases the likelihood of any such system down time.

While the invention is generally applicable to any type of memory hierarchy having one or more caches, including non-uniform memory access (NUMA) structures, it is particularly useful for larger caches which require improved reliability. In the illustrative embodiment described further below, the invention is applied to a computer system having multiple processing cores each having its own on-board (L1) cache, and two additional shared cache levels, including a "sliced" L2 cache, and an L3 cache. Those skilled in the art will appreciate, however, that the invention is not limited to this specific implementation.

Figure 1:
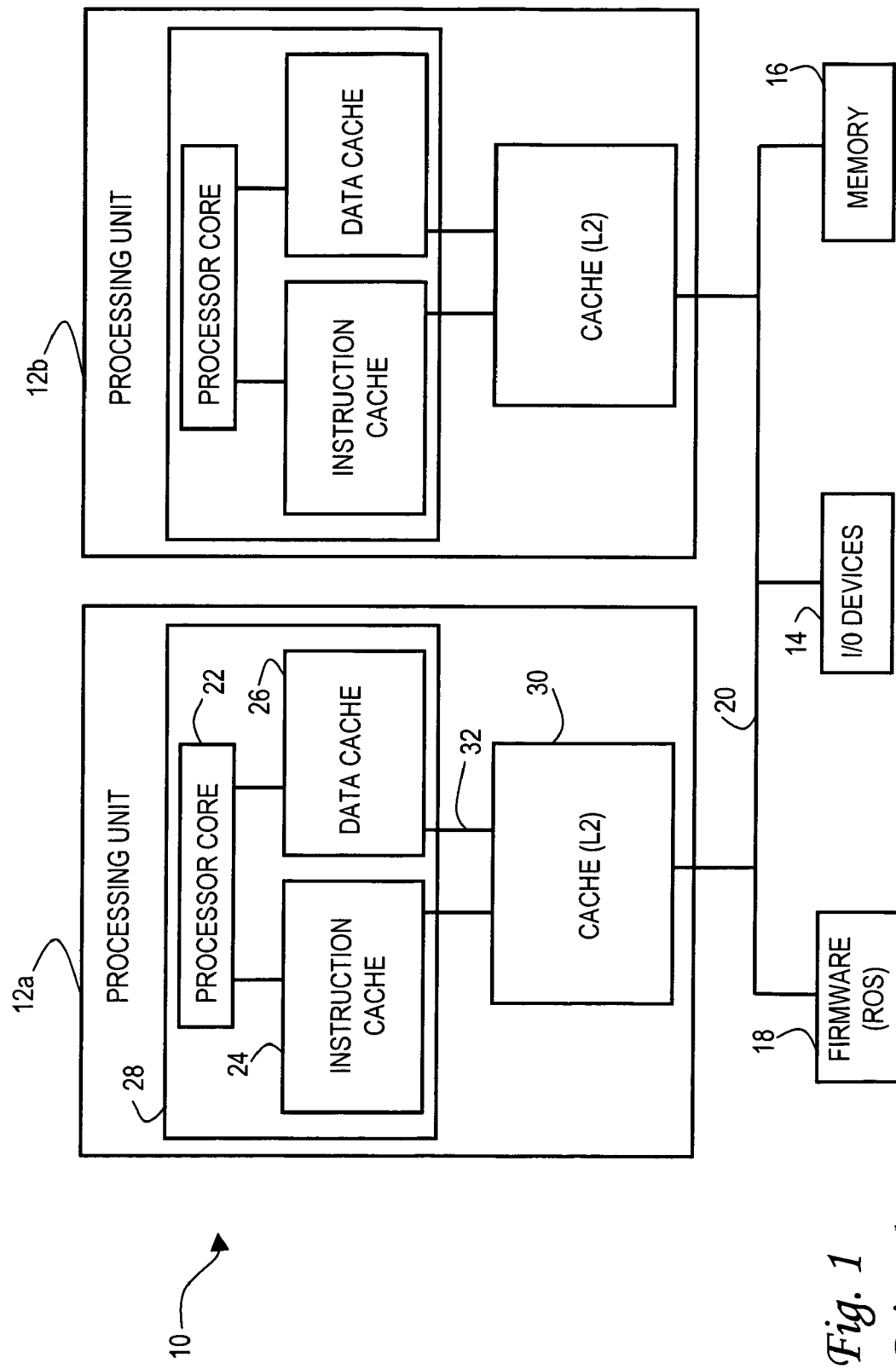
FIG. 1 is a block diagram of a conventional computer system, depicting a memory hierarchy which includes a main memory device and multiple memory caches.
Figure 2:
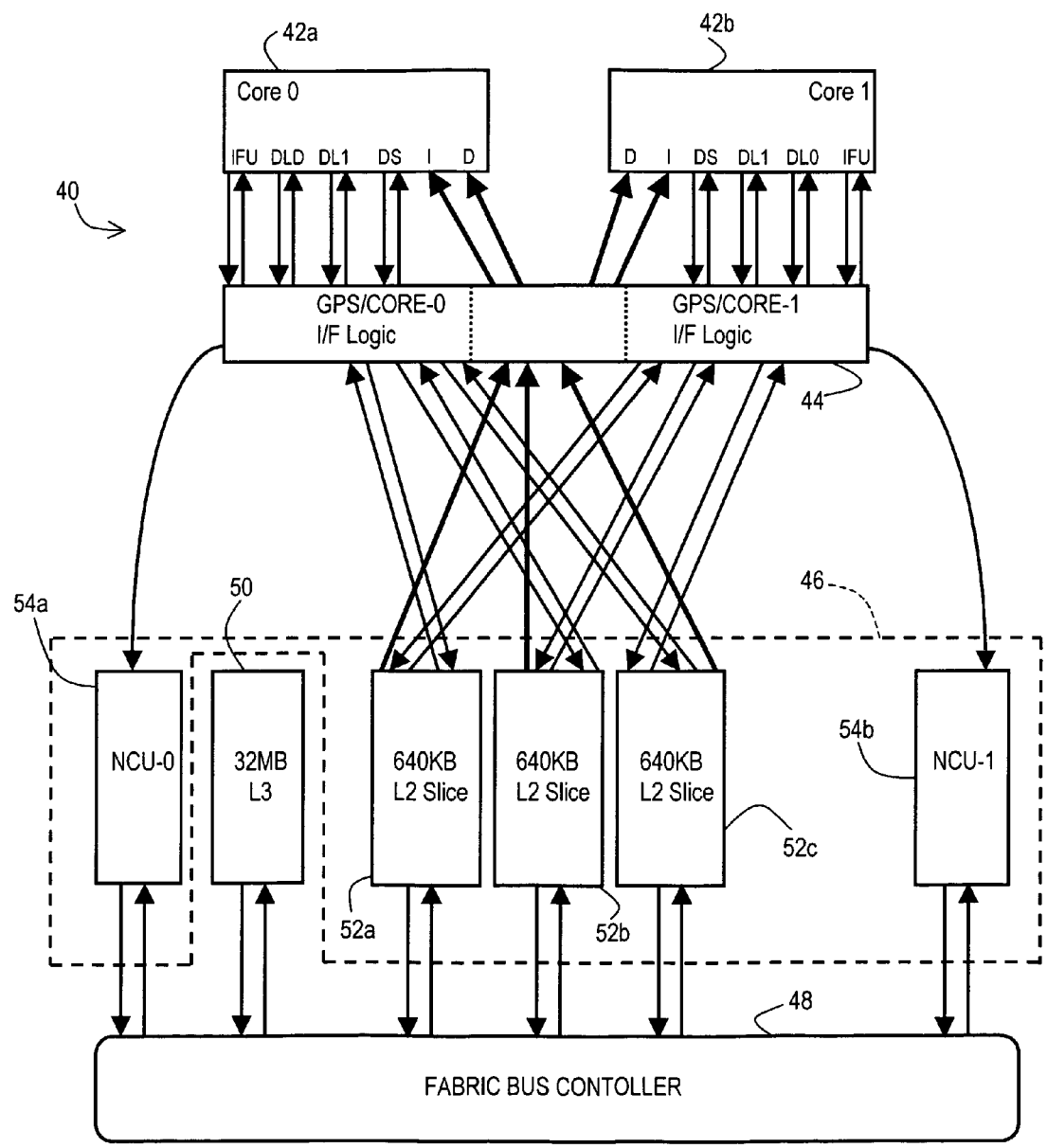
FIG. 2 is a block diagram of one embodiment of a computer system constructed in accordance with the present invention, which includes a memory hierarchy having multiple cache levels.

With reference now to the figures, and in particular with reference to FIG. 2, there is depicted one embodiment 40 of a computer system constructed in accordance with the present invention. Computer system 40 is generally comprised of two processing cores 42a and 42b, a core interface unit (CIU) 44, a "sliced" L2 cache 46, a fabric bus controller (FBC) 48, and an L3 cache 50. Each processing core 42a, 42b includes its own store-through L1 cache. Each cache has its own entry array, directory, and controller, with interfaces to the next location in the memory hierarchy. More than two processing cores may be provided.

Computer system 40 may include various other conventional elements (not shown), such as firmware or read-only memory (ROM) and main or random-access memory (RAM) coupled to a peripheral component interconnect (PCI) local bus using a PCI host bridge. The PCI host bridge can provide a low latency path through which processors 42a and 42b may access PCI devices mapped anywhere within bus memory or I/O address spaces. The PCI host bridge also provides a high bandwidth path to allow the PCI devices to access the main memory. Such PCI devices might include a local area network (LAN) adapter, a small computer system interface (SCSI) adapter providing access to a permanent storage device (e.g., a hard disk drive which stores an operating system and program files), an expansion bus bridge with user input devices such as a keyboard and graphical pointer (mouse), an audio adapter, or a graphics adapter.

The L2 cache portion 46 of the processing subsystem is divided into three primary storage slices 52a, 52b and 52c each having 640 kilobytes of memory (common to both cores), and two non-cacheable control units (NCUs) 54a and 54b (one per core). The three slices provide the flexibility to allow the use of partially good chips (i.e., the chip can be used with as little as one functional 640 KB slice). The individual slices are selected by an address hashing algorithm residing in CIU 44. The same hashing algorithm is used by FBC 48 to route snoop traffic to the L2 slices. L2 slices 52a, 52b and 52c generally handle all cacheable load/store instructions, data and instruction prefetches, zero-out instructions (e.g., DCBZ), and synchronization instructions. NCUs 54a and 54b handle all other communication with the processor cores, such as cache-inhibited load/store instructions and cache operations (excluding zero-out and similar instructions).

In the depicted embodiment, the total L2 capacity is 1.875 megabytes. The cache line size is set to 128 bytes, and is fully inclusive of the L1 data cache. L2 cache 46 is 10-way set associative, and the cache array data is protected by ECC having SBC/DBC capability. A least-recently used (LRU) algorithm is provided and may be enhanced as desired. It is preferable to provide fully redundant directory arrays with two independent read ports for core and snoop traffic. The cache entry and directory arrays may be accessed simultaneously on load requests from cores 42a, 42b.

In order to perform a cache scrub and eliminate any errors in the cache lines, the invention utilizes a means for periodically walking through a cache to force a flush action. This flushing automatically forces error correction of any single-bit errors as the data is being moved to the next lower level cache, since the cache output includes ECC logic. The scrub can be performed while the system is running and has negligible impact on the performance of the system. The means for carrying out the scrub can be implemented in software or hardware.

Software (e.g., the operating system for computer system 40) can periodically issue traditional flush instructions which increment through a special address sequence each time a new flush instruction is sent. The address sequence (discussed further below) is one that will eventually walk through the entire cache being scrubbed. The L2 and L3 LRU logic is placed in direct-mapped mode briefly when these flush instructions are being processed by the cache in order to make the victim selection predictable. In direct mapped mode victims are selected based on a simple address decode. Four tag address bits are used for the mapping. The flushing (i.e., victimization) of a cache line forces the L2 cache to consecutively victimize each entry over time. The L3 mechanism to support the purge sequence recognizes an L3 cast-in (invalid line) and treats it as an L3 miss, forcing an L3 victim to be chosen. Only valid victims need be sent to main memory. The operating system can monitor CPU usage to inject the flush instructions when cores 42a and 42b are idle or operating at a rate slow enough that will cause little or no performance impact.

A hardware mechanism can alternatively be used to push L2 values to the L3 cache. The present invention implements such a mechanism which utilizes the existing store pipe between the L1 and the L2 caches to inject a special purge command that elicits cache victimization. Software can be used to programmably trigger this hardware mechanism to automatically inject the purge commands into the store pipe at appropriate times. Each of the purge commands contains an address that, when seen by the L2 cache logic, causes it to select a victim (i.e., a block for victimization) and flush that line out of the L2 cache down to the L3 cache. By sending a series of purge commands to the L2 cache with the special address sequence, the L2 and L3 will eventually roll all of their contents out to main memory. This hardware mechanism can run while the processors are still operating, with minimal performance impact during the purge sequence.

Figure 3:
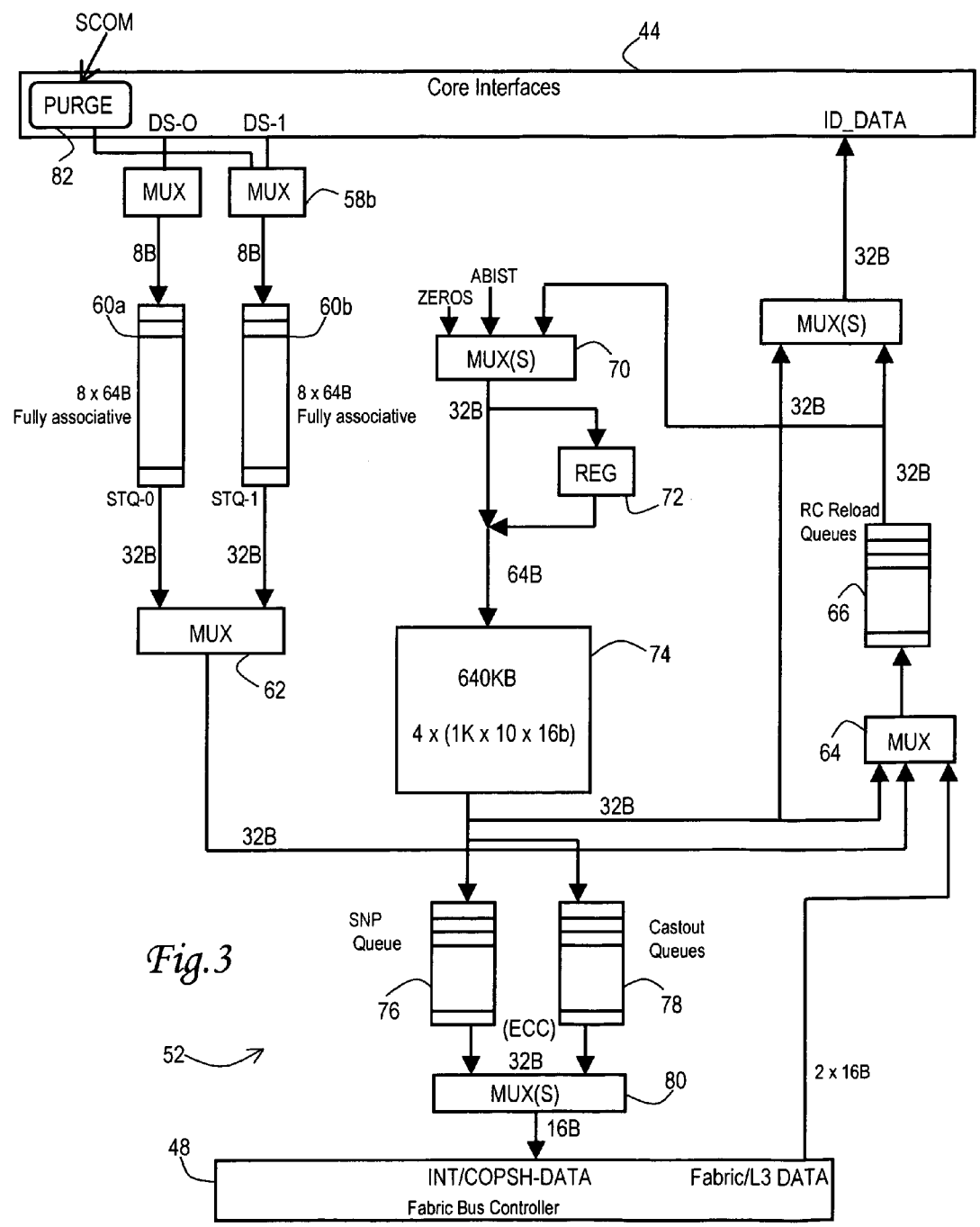
FIG. 3 is a high level schematic diagram illustrating the dataflow for one of the second level (L2) cache slices shown in the computer system of FIG. 2, which includes a purge engine used in accordance with the present invention to force a flush of the cache and thereby correct any single-bit errors in the cache lines.

The hardware implementation of the purge means of the present invention may be further understood with reference to FIG. 3 which illustrates the dataflow for a given one of the L2 cache slices 52. Each L2 cache slice 52 includes two 8×64-byte (sector), fully associative store queues 60a and 60b (one for each core), with respective data store inputs coming from CIU 44. The 32-byte outputs of store queues 60a and 60b feed a first multiplexer 62 whose output is further connected to a second multiplexer 64. Multiplexer 64 passes data to an 8×128-byte read/claim (RC) reload queue 66. The output of RC reload queue 66 branches out to a third multiplexer 68, for transmitting to CIU 44, and to a fourth multiplexer 70. Multiplexer 70 uses a register 72 to compound two 32-byte words into a full 64-byte sector which is input to the 640 KB cache array 74. The ABIST input to multiplexer 70 is used for the array built-in self test sequence that is used as part of the system power-on testing. The ZEROS input into multiplexer 70 is used to zero-out a cache line as part of a DCBZ command. The output of cache array 74 branches back to multiplexer 64, and to a snoop (intervention/push) queue 76 and a cast-out queue 78. Snoop queue 76 is 4×128-byte, and cast-out queue 78 is 8×128-byte. The snoop and cast-out queue outputs are coupled to FBC by another multiplexer 80.

In this hardware implementation, the scrubbing means includes a purge engine 82 which injects purge commands into the CIU-to-L2 store queue pipe at multiplexers 58a, 58b. These purge commands can be used to flush the L2 and L3 caches. An L2/L3 purge sequence used for flushing the L2 and L3 includes programming scan communications (SCOM) hardware to send a series of purge commands with a special set of incrementing addresses (discussed further below). The SCOM hardware may in turn be initiated by software, i.e., the service processor via a JTAG interface. The JTAG interface complies with the Institute of Electrical and Electronics Engineers (IEEE) standard 1149.1 pertaining to a test access port and boundary-scan architecture. SCOM is an extension to the JTAG protocol that allows read and write access of internal control and status registers while leaving system clocks running. Additional details of the SCOM hardware can be found in U.S. patent application Ser. No. 10/425,397 entitled "CROSS-CHIP COMMUNICATION MECHANISM IN DISTRIBUTED NODE TOPOLOGY", filed on Apr. 28, 2003, which is hereby incorporated.

This purge (flush) sequence is run while this chip's cores are idle to ensure that no cache lines get re-allocated in either the L2 or L3 cache. A request signal can be provided between the SCOM and the CIU logic for purge requests to control the flow of purges into the store queue. The arbitration logic at multiplexers 58a, 58b can give higher priority to store instructions than purge commands, so purge commands will proceed only if no store operations are pending. For hardware stress reasons, the purge may also be run while the cores are operating but there is no guarantee that the L2/L3 will have completely flushed caches at the end of the sequence due to possible L2 re-allocations. In the preferred embodiment, two SCOM controllers are provided, to cover partial good case, but only one SCOM port is enabled at any given time. As with the software implementation, the SCOM sets the LRU logic for direct-map mode to allow fixed victim selection in both the L2 and L3 caches.

Figure 4:
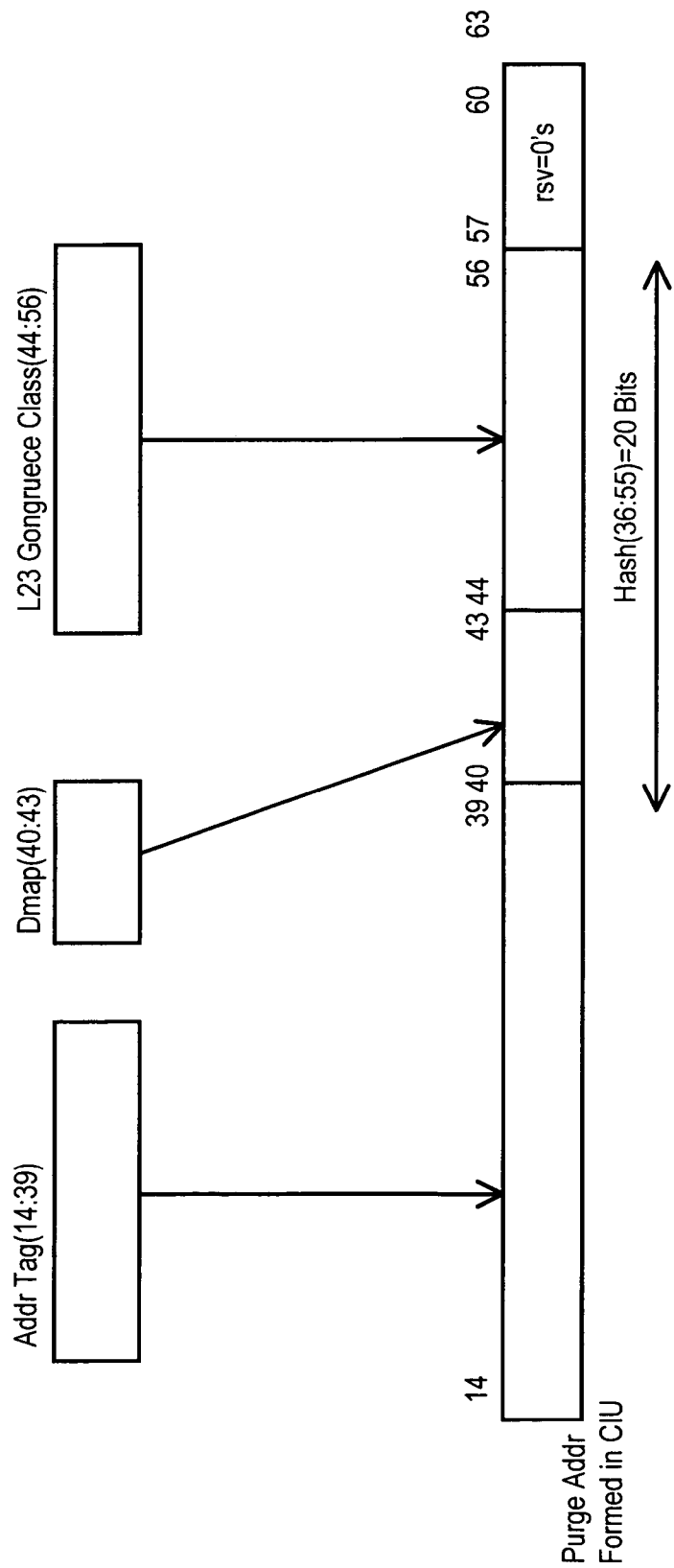
FIG. 4 is a pictorial representation of one address format for a purge command issued by the purge engine shown in FIG. 3.

Referring now to FIG. 4, there is depicted an example of the CIU/SCOM port fields and how the addresses for the purge sequence are created. The purge address formed in CIU 44 includes 50 bits, addr(14:63). The first 26 bits addr(14:39) correspond to the address tag. The next four bits addr(40:43) are used for direct mapping. The next 13 bits addr(44:56) are used to determine the proper congruence class for the particular cache line in the L2 and L3 caches (bits 48:56 are used in the L2 cache, and bits 44:55 are used in the L3 cache). The last 4 bits are reserved (i.e., unused).

The CIU hardware includes address generation logic that causes a series of purge commands to be issued by purge engine 82 while incrementing the 17 bits addr(40:56). For the flush sequence, purge engine 82 will issue one purge commands per L2 slice (or three total) on a given addr(40:56) before incrementing the address bits to the next value and repeating the commands. When purge engine 82 has incremented addr(40:56) from 0x00000 to 0x1FFFF twice, all lines of the L2 and L3 caches will be have been flushed to main memory (or the next lower level in the memory hierarchy if more cache levels are used). The tag bits AddrTag(14:39) are set to a value that points to cache-inhibited space to ensure that an L2 miss will occur. In this manner, the tag bits will force the L2 to miss the associated address, which will in turn cause an L2 cast-out for each cache line.

In either the hardware or software implementations, the rate at which the flush instructions roll through the cache can be programmably set to meet the reliability requirements of the system.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the illustrative embodiment contemplates a purge engine which is integrated into the store pipe of an L2 cache, but the invention is more generally applicable to any cache level or hierarchy. It is therefore contemplated that such modifications can be made without departing from the spirit or scope of the present invention as defined in the appended claims.

What is claimed is:

1. A method of reducing double-bit errors in a cache memory of a computer system, comprising the steps of:
   periodically issuing a series of purge commands to the cache memory;
   sequentially flushing cache lines from the cache memory to a lower level memory device of the computer system in response to said issuing step to eventually flush all cache lines from the cache memory; and
   correcting errors in the cache lines as they are flushed to the lower level memory device.

2. The method of claim 1 wherein said issuing step is performed in response to the further step of determining that one or more processor cores associated with the cache memory have an idle cycle available in a store pipe to the cache memory.

3. The method of claim 1 wherein said correcting step corrects only single-bit errors in the cache lines.

4. The method of claim 1, further comprising the step of programmably setting a flush rate for said issuing step.

5. The method of claim 1 wherein said issuing step is carried out by software running on the computer system.

6. The method of claim 5 wherein:
   the software carrying out said issuing step is an operating system of the computer system; and
   said issuing step is performed in response to the further step of the operating system monitoring CPU usage to determine that one or more processing cores of the computer system have an idle cycle available in a store pipe to the cache memory.

7. The method of claim 1 wherein said issuing step is carried out by hardware integrated with the cache memory.

8. The method of claim 7, further comprising the step of programmably triggering the hardware to issue the purge commands.

9. A purge mechanism for a cache memory of a computer system, comprising:
means for periodically issuing a series of purge commands to the cache memory;
means for sequentially flushing cache lines from the cache memory to a lower level memory device of the computer system in response to said issuing means to eventually flush all cache lines from the cache memory; and
means for correcting errors in the cache lines as they are flushed to the lower level memory device.

10. The purge mechanism of claim 9 wherein said issuing means determines that one or more processor cores associated with the cache memory have an idle cycle available in a store pipe to the cache memory.

11. The purge mechanism of claim 9 wherein said correcting means corrects only single-bit errors in the cache lines.

12. The purge mechanism of claim 9 wherein said issuing means programmably sets a flush rate for the purge commands.

13. The purge mechanism of claim 9 wherein said issuing means is implemented in software running on the computer system.

14. The purge mechanism of claim 13 wherein:
said software is an operating system of the computer system; and
said operating system monitors CPU usage to determine that one or more processing cores of the computer system have an idle cycle available in a store pipe to the cache memory.

15. The purge mechanism of claim 9 wherein said issuing means is implemented in hardware integrated with the cache memory.

16. The purge mechanism of claim 15 wherein said hardware is programmably triggered to issue the purge commands.

17. A computer system comprising:
one or more processing cores;
a main memory device;
at least one cache memory connected to said one or more processing cores and said main memory device;
a purge mechanism which periodically issues a series of purge commands that sequentially flush cache lines from said cache memory to a lower level memory device of the computer system to eventually flush all cache lines from the cache memory; and
error correction code (ECC) logic which corrects errors in the cache lines as they are flushed to said lower level memory device.

18. The computer system of claim 17 wherein said purge mechanism issues the purge commands only when said one or more processor cores have an idle cycle available in a store pipe to said cache memory.

19. The computer system of claim 17 wherein said ECC logic corrects only single-bit errors in the cache lines.

20. The computer system of claim 17 wherein said purge mechanism has a programmable flush rate for the purge commands.

21. The computer system of claim 17 wherein said purge mechanism is implemented in software running on the computer system.

22. The computer system of claim 21 wherein:
said software is an operating system of the computer system; and
said operating system monitors CPU usage to determine that said one or more processing cores have an idle cycle available in a store pipe to said cache memory.

23. The computer system of claim 17 wherein said purge mechanism is implemented in a hardware purge engine integrated with the cache memory.

24. The computer system of claim 23 wherein said purge engine is programmably triggered to issue the purge commands.

* * * * *